Aug. 9, 1966     E. J. SVENSON     3,264,873
APPARATUS FOR DETERMINING OPTIMUM MACHINING CONDITIONS
Filed April 22, 1963     3 Sheets-Sheet 1

INVENTOR.
Ernest J. Svenson
BY
Olson, Trexler, Wolters & Bushnell
attys

Aug. 9, 1966  E. J. SVENSON  3,264,873
APPARATUS FOR DETERMINING OPTIMUM MACHINING CONDITIONS
Filed April 22, 1963  3 Sheets-Sheet 3

INVENTOR.
Ernest J. Svenson
By: Olson, Trexler, Wolters & Bushnell
attys.

United States Patent Office 3,264,873
Patented August 9, 1966

3,264,873
APPARATUS FOR DETERMINING OPTIMUM MACHINING CONDITIONS

Ernest J. Svenson, Rockford, Ill., assignor to Odin Corporation, Rockford, Ill., a corporation of Illinois
Filed Apr. 22, 1963, Ser. No. 274,456
27 Claims. (Cl. 73—432)

The present invention relates to machine tools and is concerned with the solution of persistent practical problems encountered in tooling and operating machine tools so as to achieve the full potentials of machine tools with respect to operating efficiency, dependability, cost reduction, freedom from interruptions in production, minimization of essential maintenance, and other related factors which affect the productivity and economic utility of machine tools.

The present application is a continuation-in-part of applicant's co-pending application Serial No. 799,726, filed March 16, 1959, now abandoned.

The performance of machine tools in the machining of workpieces is affected by many factors that are not only difficult to evaluate and calculate individually, but which have effects in combination with each other that are practically impossible to calculate or predict reliably by theoretical methods. These factors include the metallurgy of the workpiece, which can be very complex in itself; the physical condition of the workpiece, which is not only difficult to evaluate theoretically, but which can and often does change in response to the machining performed on the workpiece; the character of the machining operation to be performed and the specific manner in which the machining operation is carried out; the design of the cutting tool used and the condition of the cutting tool in respect to its sharpness, degree of wear, and the like.

Because of the large number of the factors which affect the machining of a workpiece and because of the individual complexity and the inter-relationship of these factors to each other, theoretical methods have limited usefulness in determining optimum operating conditions for machine tools and optimum designs for cutting tools which are used in machine tools.

Prior to this invention empirical methods and procedures for determining optimum machine tool operating conditions and optimum designs for cutting tools have been of limited practical usefulness because of the impracticality of obtaining essential empirical test data. The matter of obtaining the empirical test data essential to the most effective use of empirical methods for determining optimum machine tool operating conditions and optimum designs for cutting tools is greatly complicated by the number of variable operating conditions involved and by the fact that the operating conditions can vary rapidly in the course of a test and particularly during the most critical phases of a test. It has been impossible for any one human being to observe and record in the course of a test all the operational data essential to most effective use of empirical methods for determining optimum designs and operating conditions. Even aside from the high cost involved, the use of a number of persons to observe and record data during tests cannot provide the desired data because of the rapidly changing character of some most pertinent conditions, the practical impossibility of synchronizing observations, and the impossibility of making and recording a sufficient number of observations of fast changing conditions.

As a consequence, the determination of designs for cutting tools to be used in machine tools and the specification of operating conditions under which the machine tools are used in production have involved considerable guess-work and the sacrificing of valuable potentials of machine tools, because of deviation of tool design and operating conditions from optimum designs and values.

The use of cutting tools which are not of optimum design specifications and the operation of machine tools under conditions which have not been the most favorable have been costly expedients. The economic cost of compromising potentials of machine tools is multiplied in multiple station, multiple tool installations in mass production industries wherein a procession of workpieces progress through a series of stations wherein many machining operations are performed.

Installations of machine tools which perform many machining operations offer great advantages from a number of standpoints, including great accuracy and speed of production. Yet, potential advantages offered by such installations of automatic machine tools have not been fully realized in practice because the operating conditions and tool designs which are employed in use of the machines in production are not optimum conditions and designs, for the reason that those responsible for establishing the design of machine tools, the machine operating conditions, and cutting tool designs for use in production have had no useful means of determining what designs and operating conditions would provide the maximum advantages in service.

The penalties for not knowing and using optimum machine operating conditions and tool designs in production are manifest in a number of ways. The specification of operating conditions which accelerate wear on individual tools or continued use of a worn tool under severe operating conditions can result in breakage of tools with costly losses in production time, and with a concomitant necessity for maintaining a service crew in readiness for rectifying the disruption of production. The danger of tool breakage has led to a number of costly expedients in the design and use of machine tools. The probability of failure of working tools in service has led to the inclusion of checking devices in automatic machine tools for detecting broken working tools. The incorporation of such checking devices in machine tools increases the cost and complexity of machine tools and control systems therefor.

Perhaps the most general expedient for compensating for lack of knowledge concerning the optimum operating conditions for machine tools is that of conservatism. A designer, uncertain concerning the capabilities of a drill, for example, may specify that a hole be drilled in two steps at two successive stations, whereas the exact knowledge of performance provided empirically by the present invention may reveal that the hole can be drilled more economically and efficiently in one station using less complex machining and control structure.

One object of the invention is to provide new and improved machine tool test apparatus for empirically determining optimum machine tool operating conditions and optimum cutting tool designs for maximizing the performance and service capabilities of machine tools.

Another object is to provide machine tool test apparatus having a new and improved construction which provides an exceptionally economical, efficient, and reliable means of obtaining empirical test data by recording the performance of a machine tool and cutting tools therefor under a wide range of operating conditions.

Another object is to provide a machine tool test machine of the character recited in the preceding objects which automatically records optically in coordinated relation to significant phases of successive machining operations the instantaneous operating conditions under which the machining is performed.

Another object is to provide new and improved machine tool test apparatus which affords a practical means of empirically exploring machine tool operational phenomena which are most critically related to the causing of damage to workpieces and to the malfunctioning and failure of cutting tools.

A further object is to provide a machine tool test apparatus of a new and improved construction which can be easily operated without great skill to empirically investigate and rectify operating conditions of drills which cause damage to workpieces by the force which feeds a drill bit into a workpiece.

Another object is to provide machine tool test apparatus of the character recited which affords significant advantages in empirically evaluating the service life of cutting tools under different operating conditions and the effects of cutting tool wear under different operating conditions.

Another object is to provide a new and improved method for empirically determining optimum machine tool operating conditions and tool designs.

Other objects and advantages will become apparent from the following description of the exemplary embodiment of the invention illustrated in the drawings, in which.

Referring to the drawings in greater detail, the testing machine 10 forming the illustrated embodiment of the invention is designed for use in empirically determining optimum designs for drill bits and optimum machine tool operating conditions for drilling a workpiece.

Figure 1:
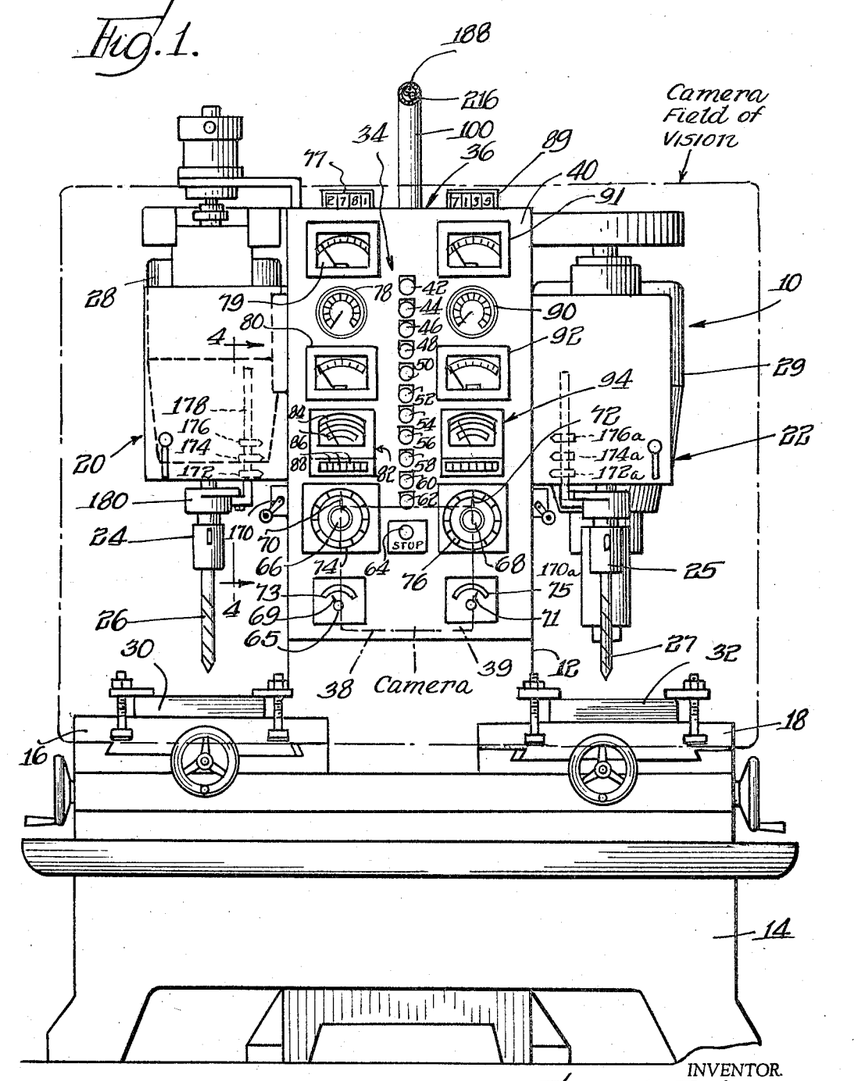
FIGURE 1 is a front elevational view of the machine tool test machine forming the illustrated embodiment of the invention, certain components of the machine being shown in phantom for clarity of illustration.
Figures 2, 3, 4:
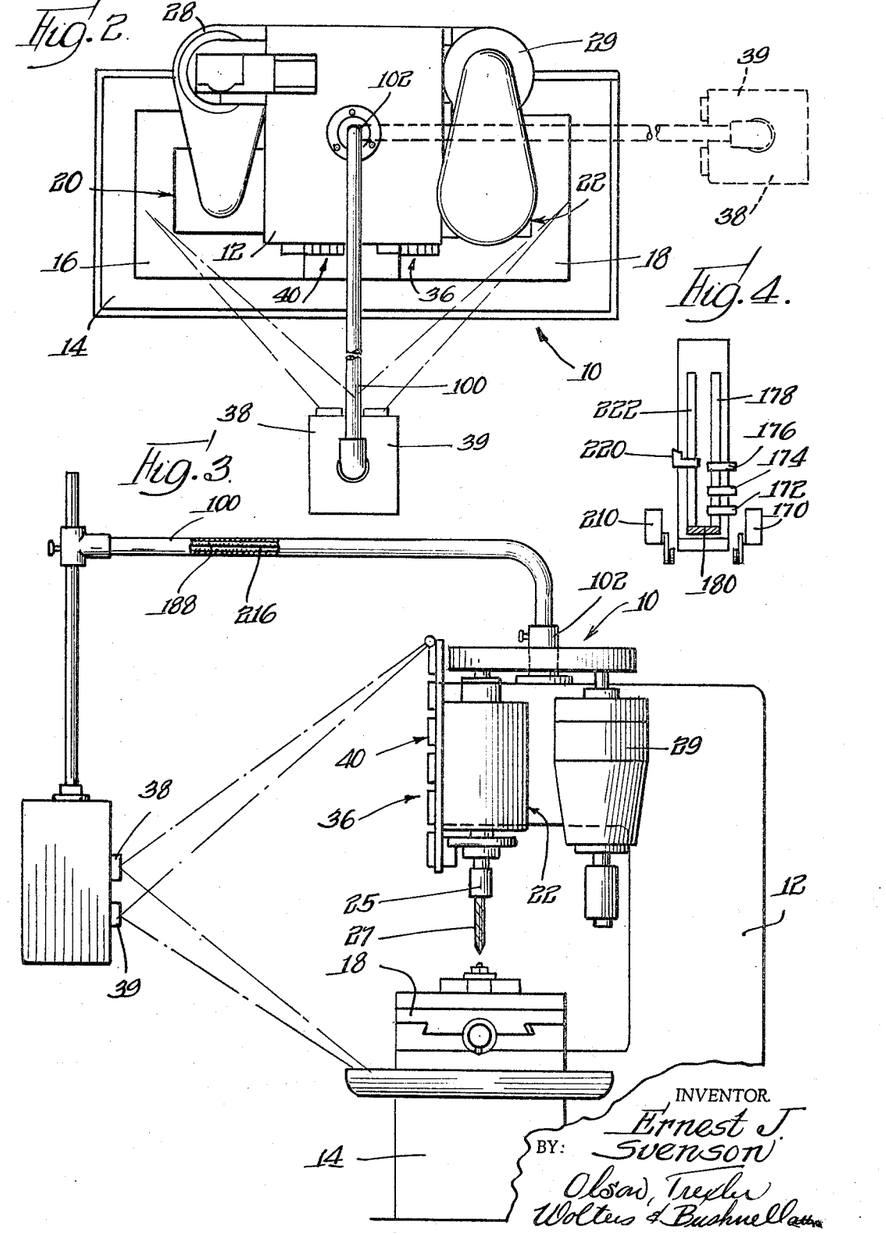
FIG. 2 is a plan view of the machine.
FIG. 3 is a right end elevation of the machine.
FIG. 4 is a fragmentary sectional view on an enlarged scale, taken generally with reference to the line 4—4 of FIG. 1 and showing synchronizing switch structure.

As shown, the machine 10 comprises a vertical column 12 extending upwardly from a horizontal bed 14. Two work support tables 16, 18 located on opposite sides of the column 12, as shown in FIG. 1, are supported on opposite ends of the bed 14 forwardly of the column 12 as shown in FIG. 3.

Two drilling heads 20, 22 are mounted on the column 12 in overlying relation to the respective work support tables 16, 18 for vertical movement toward and away from the tables. The drilling heads 20, 22 carry respectively single depending spindles 24, 25 which support drill bits 26, 27. Operating power for the respective drilling heads 20, 22 is supplied by two variable speed electric motors 28, 29 on the column 12 as shown. Preferably, the motors 28, 29 are controlled by speed control means which not only provides for adjustably varying the speed of the motors but which also includes tachometer feedback circuits or other conventional speed maintaining means for maintaining the preadjusted desired speed of each motor under varying load conditions.

The drilling head 20 is powered to drive its spindle 24 at variable speeds within a high speed range, which may extend, for example, between 1,000 and 9,000 revolutions per minute. The other drilling head 22 is powered to drive its spindle 25 at variable speeds within a low speed range, which may extend between 350 and 1500 revolutions per minute, for example. In the ensuing description, the spindles 24 and 25 will be referred to respectively as the "high speed" spindle and the "low speed" spindle.

Controlled feeding of the drill bits 26, 27 into underlying workpieces 30, 32 on the respective support tables 16, 18 is effected by feeding means provided for translating each of the drilling heads 20, 22 toward its corresponding work support table. While the invention is not limited to use of any particular means for advancing and retracting each drilling head with respect to the corresponding work support table, it is advantageous to use for this purpose hydraulic feeding means of the character disclosed in applicant's United States Patents Nos. 2,266,829 and 2,804,749.

Figure 6:
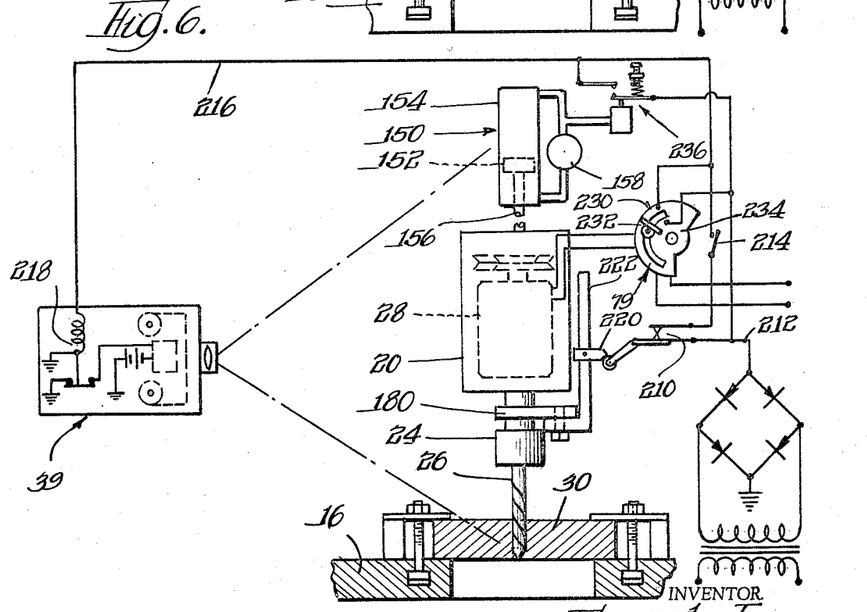
FIG. 6 is a schematic and somewhat diagrammatic view similar to FIG. 5 but illustrating the means which automatically correlates operation of the rapid sequence camera with critical phases in the operation of one spindle of the machine.

The hydraulic feeding means connected with the drilling head 20 to feed the spindle 24 toward the table 16 is illustrated schematically in FIG. 6 and identified by the number 150. In general, the feeding means 150 comprises a piston 152 slidably disposed within a cylinder 154 and connected, as illustrated, to the drilling head 20 by a piston rod 156 extending through one end of the cylinder 154. A pump 158 having a positive and accurately adjustable displacement, as do the feed pumps disclosed in applicant's previously mentioned Patents Nos. 2,266,829 and 2,804,749, is connected between opposite ends of the cylinder 154 to effect feeding of the spindle 24 at a constant speed adjustably determined by preadjustment of the pump 158.

Controllable machine tool operating conditions under which drilling tests are performed are adjustably controlled by manual controls 34 grouped on an instrument panel 36 located on the front of the machine and supported by the column 12 between the drilling heads 20 and 22 as shown.

The manner in which the controls 34 are used to vary the operating conditions under which successive drilling cycles are performed will be presently described in greater detail.

The machine 10 provides novel and highly advantageous recordings of the operating conditions of the machine which afford the most meaningful and reliable empirical basis for determining optimum operating conditions and cutting tool specifications for machining workpieces having physical properties similar to those under test. Moreover, this recording of the machine tool operating conditions is automatically executed in synchronism with the most critical and revealing phases of machining test cycles, all in a manner which minimizes the skill required and the time and cost entrailed in determining optimum machining conditions and optimum tool designs for performing particular machining operations on workpieces of a particular character.

Recording of the most meaningful machine tool operating conditions is effected optically by two cameras 38, 39 mounted on the machine 10 and operated automatically in synchronism with the most revealing phases of machining test cycles. The cameras 38, 39 are supported on the machine 10 in front of the instrument panel 36 and prefocused to photographically record machine operating conditions as indicated by monitoring instruments 40 grouped together on the instrument panel 36, as shown in FIG. 1.

As shown, two separate sets or groups of instruments 40 are provided for the respective machining heads 20, 22 and arranged in two vertical columns on opposite sides of the instrument panel 36.

The manually operated machine tool controls 34 are arranged in a vertical column between the two vertical columns of monitoring instruments 40 and comprise the following, starting from the top in FIG. 1: a master start switch 42, a traverse drive start switch 44, a traverse drive stop switch 46, a coolant start switch 48, a coolant stop switch 50, a feeding speed range selector switch 52 for the low speed spindle feed rate meter 94, a feeding speed selector switch 54 for the high speed spindle feed rate meter 82, a spindle start switch 56 for the low speed spindle, a spindle stop switch 58 for the low speed spindle, a spindle start switch 60 for the high speed spindle, a spindle stop switch 62 for the high speed spindle, and a master stop switch 64.

A motor speed adjusting knob 66 near the lower left hand corner of the instrument panel 36, FIG. 1, provides for adjustment of the speed of the high speed spindle 24 within its speed range. Similarly, a motor speed adjustment knob 68 mounted near the lower right hand corner of the instrument panel 36 provides for adjustment of the speed of the low speed spindle 25 within its speed range. The settings of the spindle speed adjustment knobs 66, 68 are visually indicated by pointers 70, 72 on the respective knobs coacting with graduated scales 74, 76 as shown.

A feed rate adjustment knob 65 in the lower left hand corner of the instrument panel 36, provides for adjustment of the rate of feeding of the high speed spindle 24 by the previously mentioned hydraulic feeding means 150. Similarly, a feed rate adjustment knob 67 in the lower right hand corner of the instrument panel 36 provides for adjustment of the rate of feeding of the low speed spindle 25. The settings of the feed rate adjustment knobs 65, 67 are visually indicated by pointers 69, 71 on the respective knobs coacting with graduated scales 73, 75 as shown.

The instruments 40 for monitoring operation of the high speed spindle 24 are grouped vertically on the left hand side of the instrument panel 36 and comprise, from top to bottom: a cycle counter 77 for counting drilling cycles of the spindle 24 and visually indicating the number of the drilling cycle for each feeding advancement of the spindle 24, a torque meter 79 constructed as an electrical power meter connected to respond to the electrical power drawn by the spindle drive motor 28 and being graduated in terms of torque to indicate the torque reaction on the spindle 24 as manifest by the power drawn by the motor 28, a thrust gauge 78 for indicating the thrust or tool pressure with which the high speed spindle engages its tool 26 with the workpiece, a speed indicator or tachometer 80 which indicates the instantaneous rotary speed of the high speed spindle, and a feeding speed indicator 82 which indicates the linear speed at which the high speed spindle and its cutting tool are fed toward the work.

The feeding speed indicator 82 for the high speed spindle has a high speed indicating scale 84 and a low speed indicating scale 86.

A plurality of push button controls 88 mounted along the bottom of the feeding speed indicator 82 provide for selectively conditioning the indicator 82 to indicate the feeding speed of the spindle 24 within different ranges of the spindle feeding speed.

The monitoring instruments 40 for the low speed spindle 25, mounted in a vertical column on the right hand side of the instrument panel 36, are similar to those which monitor the high speed spindle and comprise, from top to bottom, a cycle counter and indicator 89, a torque indicator 91, a thrust gauge 90, a spindle speed indicator 92, and a multiple speed range feeding speed indicator 94.

To determine empirically the optimum machine tool operating conditions and the optimum design of the cutting tool for performing a particular machining operation on a workpiece of a particular character, a series of machining tests are performed by the machine 10 under ranges of different operating conditions which encompass the optimum conditions which are to be established. In instances in which it is desirable to determine the optimum design specifications for the cutting tool to be used for a particular machining job, the empirical tests are repeated by the machine 10 using cutting tools of different design specifications to provide empirical data on the performance of the tools of the machining tests, in order to reliably determine the optimum design specifications for the tool to be used in production.

Some of the machine tool operating conditions which are most directly related to the performance of an individual machining test are subject to the control of the attendant and are normally preset before the beginning of each machine test cycle.

Thus, having reference to the testing machine 10, the rate at which the drilling tool 26 is fed into the workpiece 30 is preadjusted by adjustment of the speed rate control knob 65 for the drilling head 20. Similarly, the speed with which the drilling tool 26 is rotated as it is fed into the workpiece 30 is adjustably determined by the adjusted setting of the spindle speed adjustment knob 66 for the drilling head 20.

Other operating conditions of the test machine 10 which are directly related to the drilling of a test hole in the workpiece 30, for example, by the drilling tool 26, are affected and determined, not only by the preadjusted feeding speed of the tool 26 and the preadjusted rotary speed of the tool 26, but also by the physical character of the workpiece 30, the design and condition of the drilling tool 26, and the character of the hole to be drilled. The machine tool operating conditions which are affected and determined by the various factors just mentioned include the thrust with which the drilling tool 26 is forced into the workpiece 30 and the torque reactions of the tool 26 on the driving spindle 24, which torque reaction is, of course, equal to the torque applied to rotate the tool 26.

It will be appreciated that the torque, for example, required to rotate the tool 26 is affected by all the various factors just mentioned and tends to increase as the tool is worn and becomes less sharp. Any combination of factors which increases the torque reaction on the tool 26, for example, to a value approaching the torsional strength of the tool immediately gives rise to the danger of tool breakage which occurs when the torque reaction exceeds the torsional strength of the tool.

In those instances in which a hole is to be drilled all the way through a workpiece, the acceptability of the drilling operation performed may be critically affected by the action of the drilling tool as it "breaks through" the far or remote side of the workpiece. That phase of a drilling cycle in which the drill bit "breaks through" the remote side of a workpiece is a critical one, in that the action which takes place and the manner in which the drill bit breaks through may determine whether or not the remote surface of the workpiece adjacent the drill hole is damaged so as to make the drilling unacceptable.

As previously intimated, the factors which affect drilling operations and which are manifest in the operating conditions relating to a drilling test are quite complex individually, and are interrelated to each other in a manner which is so extremely complex that theoretical analysis and calculation of the effect of these factors on a theoretical basis is impractical.

Some of the most involved factors affecting the machining of a particular workpiece include the metallurgy of the workpiece (which is never simple and which may be very complex and may vary from point to point within the workpiece and from time to time during the machining operation), the physical condition for the workpiece in relation to its temper, for example, which may affect its hardness, brittleness, etc., and the response of the workpiece to the machining itself. Thus, not all workpieces respond in the same manner to work hardening and changes in temperature which may stem from the action of the cutting tool on the workpiece, which in turn may be affected by the design of the cutting tool and other factors, such as the cutting tool speed, the feeding speed of the tool and the effect of any cooling means used.

Figure 5:
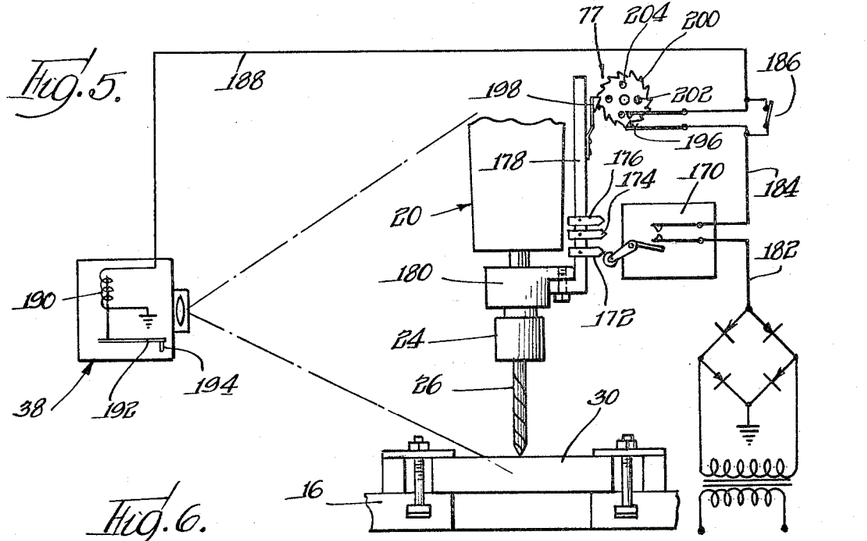
FIG. 5 is a schematic and somewhat diagrammatic side elevational view of the machine illustrating the means which provides the desired synchronization of the still camera with the functioning of the drilling action of one spindle of the machine.

The automatic control means employed to operate the single frame camera 38 to record the machine tool operating conditions prevailing during significant phases of individual machining cycles is illustrated in FIGS. 1 and 5. As shown, the single frame camera 38 is operated, to optically record all of the operating conditions and a view of the machining action at once, by a switch 170 mounted on the column 12 for operation by a plurality of switch operating cams 172, 174, 176 adjustably secured to a linear support bar 178 attached to a collar 180 for translation with the drilling head 20. The support bar 178 is parallel to the direction of translation of the drilling head 20.

The switch 170 has the structural form of a conventional limit switch. As illustrated diagrammatically in FIG. 5, the switch 170 is normally open and is connected between a low voltage power supply conductor 182 and a conductor 184. A selector switch 186 connects the conductor 184 through a conductor 188 to energize a grounded solenoid 190 which operates through a lever 192 to actuate a shutter control 194 on the camera 38 to effect taking of a picture of the instrument panel 36 and the machining action in progress.

As illustrated in FIG. 5, the lowermost cam 172 is adjusted on the bar 178 to effect closure of the switch 170 to record by the camera 38 the machining conditions prevailing as the drilling tool 26 first enters the workpiece 30. The cam 174 just above the cam 172 is adjusted to effect a second closure of the switch 170 to record the drilling conditions prevailing when the drill is cutting through a medial portion of the workpiece which may typify the drilling action for a particular cycle.

The uppermost cam 176 is adjusted to close the switch 170 to cause the single frame camera 38 to record the drilling conditions just as the drill breaks through the remote side of the workpiece.

The camera 38 itself is equipped with a suitable film winding and shutter cocking mechanism (readily available in the camera art and requiring no description here) which readies the camera to take a picture upon actuation of the control 194 by closure of the switch 170, as described.

In conducting a series of empirical tests to determine the effect of tool wear in performing a particular machining operation, it may be unnecessary to record the operating conditions for each drilling cycle. In such a situation, recording the conditions prevailing during individual drilling cycles at intervals of a plurality of cycles may be preferable.

When this is the case, the switch 186 is opened so that the switch 170 actually operates the camera 38 only when the conductors 184 and 188 are connected through a switch 196 operated by the cycle counter 77, as indicated schematically in FIG. 5.

In the schematic illustration in FIG. 5, a pawl 198 carried by the bar 178 rotatably indexes a ratchet wheel 200 bearing a pin 202 that closes the switch 196 to effect operation of the camera 38 by the switch 170 during one drilling cycle of each revolution of the wheel 200 which corresponds to a sizable number of drilling cycles.

In the schematic illustration shown, the cycle counting ratchet wheel 200 has a number of holes 204 in which additional switch actuating pins (not shown) may be mounted to reduce the number of machining cycles between the taking of pictures by the camera 38.

The camera 39 is a rapid sequence camera having the capability of taking a large number of pictures in rapid succession. This camera is controlled in a manner such that it automatically records the rapidly changing machine operating conditions which may cause or attend damage to either the workpiece or the cutting tool. The operating conditions, which may be most revealing as to the cause of undesirable functioning of the machining process and which may provide the most helpful clues as to the cause of functional shortcomings, may prevail for only very short periods during which the conditions may be rapidly changing.

Such meaningful operating conditions are permanently captured by the high speed sequential camera 39 which is automatically synchronized with crucial and unusual phases of the machining operation by means of the automatic control structure illustrated diagrammatically in FIG. 6.

As previously intimated, a troublesome source of workpiece damage in a drilling operation is the action which accompanies a "break through" of the drill bit through the remote side of the workpiece. As indicated diagrammatically in FIG. 6, provision is made for automatically operating the high speed sequential camera 39 for taking a large number of pictures in rapid succession as the drilling tool 26 breaks through the remote side of the workpiece 30.

This is effected as illustrated by means of a switch 210 which connects a low voltage power supply conductor 212 through a selector switch 214 to a conductor 216 that energizes a relay 218 that effects operation of the camera 39. For the purpose of illustration, the camera 39, which may be readily provided by those skilled in the camera art and requiring no specific description here, is electrically driven and connected to operate upon energization of the relay 218.

The switch 210 is operated by a cam 220 adjustably positioned on a bar 222 to close the switch 210 as the drilling tool 26 reaches the far side of the workpiece. As shown in FIGS. 4 and 6, the bar 222 is parallel to the previously mentioned switch support bar 178 and is supported on the same collar 180 with the bar 178.

Normally, it is not necessary to take a high speed sequence of pictures during the "break through" of the cutting tool 26 during each successive drilling cycle. For this reason, the selector switch 214 is provided in series with the switch 210 to enable the operator to determine when such sequential "break through" pictures are taken.

As previously intimated, an abnormal increase in either the torque or the thrust applied to the drilling tool 26 may presage breaking of the tool or improper performance causing damage to either the tool or the workpiece.

As indicated diagrammatically in FIG. 6, the power meter 79, which is responsive to the electrical power drawn by the motor 28, operates to close a torque switch 230 when the torque applied to the drilling tool 26 exceeds a predetermined value as reflected by the electrical power drawn by the motor 28. Closure of the switch 230 connects the conductor 212 with the conductor 216 to effect operation of the rapid sequence camera 39 to record the prevailing machine tool operating conditions.

Suitable provision is made for adjusting the electrical power consumption, and hence the drill spindle torque at which the switch 230 is closed, to operate the camera 39. As indicated in FIG. 6, this is effected by making the movable contact element 232 of the switch 230 adjustable along a rotary carrier 234 for the contact element 232. The rotary position of the carrier 234 is determined by the rate at which electrical power is drawn by the motor 28.

An increase in the thrust applied to the tool 26 to a value which may cause damage either to the tool or the workpiece effects an automatic operation of the rapid sequence camera 39. As shown in FIG. 6, an adjustable pressure switch 236 is connected electrically between the conductors 212 and 216, and is connected hydraulically to the end of the cylinder 154 opposite the connecting rod 156, to effect operation of the camera 39 when the thrust applied to the tool 26 exceeds a predetermined value, as determined by adjustment of the switch 236.

In FIG. 1, the camera control elements coacting with the drilling head 22 and corresponding to those previously described, and coacting with the drilling head 20, are identified with the same reference numbers, with the addition of the suffix "a."

As shown, the cameras 38 and 39 are supported by a swingable cantilever arm 100 pivotally supported for swinging movement about a vertical axis by a swivel mount 102 supported at the top of the column 12 just rearwardly of the instrument panel 36, as shown in the drawings. The control wires or conductors 188, 216 for the cameras 38, 39 extend through the cantilever arm 100 to the cameras. The arm 100 can be swung horizontally about its support axis from an out-of-the-way position, illustrated in phantom in FIG. 2, to an operative position shown in solid lines in FIGS. 1 and 2, in which the arm supports the cameras 38, 39 at an exact predetermined distance from the instrument panel 36.

From the instantaneously recorded information obtained empirically by the testing machine 10 described, it is a relatively simple and practical matter to determine the optimum machine tool operating conditions and the optimum cutting tool design specifications for performing a particular machining operation in production.

For any particular quantity of workpieces which are to be machined, those skilled in the art can utilize data obtained empirically by the testing machine 10 described above as the basis for selection of operating conditions and design specifications for groups of cutting tools to perform a multiplicity of machining operations at a series of stations on a machine or series of machines, to maximize production and reliability while minimizing the cost of machining workpieces and minimizing the cost, complexity, maintenance, and size of necessary machinery.

The invention is claimed as follows:

1. A testing machine for determining empirically optimum tool design specifications and optimum machine tool operating conditions for performing particular machining operations, comprising, in combination, machine tool support structure, a workpiece support mounted on said support structure, a rotary tool support spindle mounted on said support structure, driving means for rotating said spindle at different speeds, a first adjustable control for adjusting the rotary speed at which said spindle is driven by said driving means, feeding means for feeding said spindle toward said workpiece support at an adjustable feeding speed, a second adjustable control for adjusting the feeding speed at which said spindle is fed toward said workpiece support by said feeding means, a single frame camera, a rapid sequence camera, means on said support structure supporting said cameras in positions such that the optical field of each camera covers at least partially said spindle and said workpiece support, said first and second adjustable controls being positioned within the optical field of each of said cameras, a thrust indicator mounted on said support structure and positioned within the optical field of each of said cameras for visually indicating the thrust applied to said spindle, a torque indicator mounted on said support structure and positioned within the optical field of each of said cameras for visually indicating the torque applied to said spindle, a feeding speed indicator mounted on said support structure and positioned within the optical field of each of said cameras for visually indicating the feeding speed of said spindle toward said workpiece support, a spindle speed indicator mounted on said support structure and positioned within the optical field of each of said cameras for visually indicating the rotary speed of said spindle, a machining cycle counter including a cycle indicator mounted on said support structure and positioned within the optical field of each of said cameras for visually indicating the numbers of successive feeding movements of said spindle toward said workpiece support, synchronizing means for operating said single frame camera to photographically record the values indicated by all of said indicators automatically in response to feeding movement of said spindle toward said workpiece support into a predetermined positional relationship of the spindle relative to the workpiece support, said synchronizing means including first and second camera control means one of which is mounted on said machine tool support structure and the other of which is interconnected with said spindle to be moved in coacting relation to the one camera control means in response to feeding movement of said spindle, said first camera control means comprising a camera triggering switch interconnected with said single frame camera to trigger operation of the single frame camera to take a picture, the other of said camera control means including a plurality of adjustable switch actuating elements for actuating said switch upon movement of said spindle into different positions in relation to said workpiece support as determined by the adjustment of said switch actuating elements, a spindle torque responsive control connected with said rapid sequence camera to effect operation of the latter automatically in response to application of a predetermined torque to said spindle, a spindle thrust responsive control interconnected with said rapid sequence camera to effect operation of the latter automatically in response to application to said spindle of thrust in excess of a predetermined thrust value, and a camera control interconnected between said rapid sequence camera and said spindle to effect operation of said rapid sequence camera in response to movement of said spindle into a predetermined position in relation to said workpiece support.

2. A testing machine for determining empirically optimum tool design specifications and optimum machine tool operating conditions for performing particular machining operations comprising, in combination, machine tool support structure, a workpiece support mounted on said support structure, a rotary tool support spindle mounted on said support structure, adjustable driving means for rotating said spindle at different speeds, variable speed feeding means for effecting relative movement of said spindle and said workpiece support to feed a tool on said spindle into a workpiece on said workpiece support, camera means, means on said support structure supporting said camera means in a position such that an optical field of the camera means covers at least partially said spindle and said workpiece support, a thrust indicator mounted on said support structure and positioned within said optical field of said camera means to indicate visually the thrust applied to said spindle, a torque indicator mounted on said support structure and positioned within said optical field for visually indicating the torque applied to said spindle, a feeding speed indicator mounted on said support structure and positioned within said optical field for visually indicating the feeding speed of said spindle toward said workpiece support, a spindle speed indicator mounted on said support structure and positioned within said optical field for visually indicating the rotary speed of said spindle, a machining cycle counter including a cycle indicator mounted on said support structure and positioned within said optical field for visually indicating the numbers of successive feeding movements of said spindle toward said workpiece support, a spindle torque responsive control connected with said camera means to effect in response to application of a predetermined torque to said spindle automatic operation of said camera means to record photographically the values indicated by all of said indicators, a spindle thrust responsive control interconnected with said camera means to effect operation of the latter automatically in response to application to said spindle of thrust in excess of a predetermined thrust value, and camera control means interconnected between said camera means and said spindle to effect operation of said camera means automatically in response to relative movement of said spindle and said workpiece support into a predetermined positional relationship to each other.

3. A testing machine for determining empirically optimum tool design specifications and optimum machine tool operating conditions for performing particular machining operations comprising, in combination, a workpiece support, a rotary tool support element, adjustable driving means for rotating said tool support element at different speeds, a tool speed indicator for indicating visually the rotary speed of the tool support element, variable speed feeding means for effecting feeding movement relatives to each other of said tool support element and said workpiece support, a feeding speed indicator for indicating visually the speed of relative feeding movement of said tool support element and said workpiece support, camera means, means supporting said camera means in a position in which an optical field of the camera means covers said tool speed indicator and said feeding speed indicator, a torque indicator positioned within said optical field of the camera means for visually indicating the torque applied to said tool support element, a torque responsive control interconnected between said tool support element and said camera means to effect in response to application of a predetermined torque to said tool support element automatic operation of said camera means to record photographically the values indicated simultaneously by all of said indicators, and camera control means interconnected between said camera means and said tool support element to effect operation of said camera means automatically in response to relative movement of said tool support element and said workpiece support into a predetermined positional relationship to each other.

4. A tool testing machine comprising, base means, a tool support means connected to said base means, workpiece support means connected to said base means, driving means connected to said tool support means for applying torque to said tool support means, said workpiece support means and tool support means defining an intermediate work area, torque sensing means connected to said driving means, camera means, support means for positioning said camera means in a position in which an optical field of the camera means includes said work area, and camera control means interconnecting said camera means and torque sensing means to actuate said camera means when a predetermined torque is applied to said tool support means by said driving means.

5. A testing machine for a machine tool comprising, support structure, a workpiece support mounted on said support structure, a tool support element mounted on said support structure, driving means connected to said tool support element, feeding means connected to said tool support element for effecting feeding movement of said tool support element relative to said workpiece support, camera means, means on said support structure supporting said camera means in a position such that an optical field of the camera means includes at least part of said workpiece support, a tool feeding force indicator mounted on said support structure and position within said optical field of said camera means for indicating visually the feeding force applied to said tool support element, a torque indicator mounted on said support structure and positioned within said optical field for visually indicating the torque applied to said tool support element by said driving means, a feed rate indicator mounted on said support structure and positioned within said optical field for visually indicating the speed of relative feeding movement of said tool support element and said workpiece support, a tool speed indicator mounted on said support structure and positioned within said optical field for visually indicating the rotary speed of said tool support element, a machining cycle counter including a cycle indicator mounted on said support structure and positioned within said optical field for visually indicating the numbers of successive feeding movements of said spindle toward said workpiece support, and means for operating said camera to photographically record simultaneously the values indicated by all said indicators.

6. A testing machine for determining empirically optimum tool design specifications and optimum machine tool operating conditions for performing particular machining operations, comprising, in combination, machine tool support structure, a workpiece support mounted on said support structure, a rotary tool support element mounted on said support structure, driving means for rotating said tool support element at different speeds, a tool speed indicator for indicating visually the rotary speed of said tool support element, variable speed feeding means for effecting feeding movement relative to each other of said tool support element and said workpiece support, a feeding speed indicator for indicating visually the speed of relative feeding movement to said tool support element and said workpiece support, a rapid sequence camera, means on said support structure supporting said camera in a position such that the optical field of the camera covers said tool speed indicator and said feeding speed indicator, a tool feeding force indicator mounted on said support structure and positioned within the optical field of said camera for visually indicating the tool feeding force applied to said tool support element, a torque indicator mounted on said support structure and positioned within the optical field of said camera for visually indicating the torque applied to said tool support element, and automatic camera control means connected to sense torque applied to said support element and connected to said camera to effect operation of the latter to photograph all of said indicators in response to an increase to a predetermined value of the torque applied to said tool support element.

7. A testing machine for determining empirically optimum tool design specifications and optimum machine operating conditions for performing particular machining operations, comprising, in combination, machine tool support means, a rotary tool support element supported on said support means, variable speed driving means for rotating said tool support element at different speeds, a tool speed indicator for indicating visually the rotary speed of said tool support element, a workpiece support supported on said support means, variable speed feeding means for effecting feeding movement relative to each other of said tool support element and said workpiece support, a feeding speed indicator for indicating visually the speed of relative feeding movement of said tool support element and said workpiece support, camera means, means on said support means supporting said camera means in a position in which an optical field of the camera means covers said tool speed indicator and said feeding speed indicator, a tool feeding force indicator positioned within said optical field of said camera means for indicating visually the tool feeding force applied to said tool support element, and synchronizing means for operating said camera to photographically record the values indicated by all of said indicators automatically in response to relative movement of said tool support element and said workpiece support into a predetermined positional relationship to each other, said synchronizing means including first and second camera control means one of which is connected with said workpiece support and the other of which is connected with said spindle to move in coacting relation to the one camera control means in response to relative feeding movement of said tool support element and said workpiece support, said first camera control means comprising a camera control switch connected to effect operation of said camera, the other of said camera control means including an adjustable switch actuating element for actuating said switch upon relative movement of said tool support element and said workpiece support into a positional relationship to each other determined by the adjustment of said switch actuating element.

8. A testing machine for determining empirically optimum tool design specifications and optimum machine tool operating conditions for performing particular machining operations comprising, in combination, a first element adapted to support a tool, a second element adapted to support a workpiece, adjustable driving means for rotating one of said elements at different speeds, a cutting speed indicator for indicating visually the rotary speed of said one element, variable speed feeding means for effecting feeding movement relative to each other of said first and second elements, a feeding speed indicator for indicating visually the speed of relative feeding movement of said first and second elements, camera means, means supporting said camera means in a position in which an optical field of the camera means covers said tool speed indicator and said feeding speed indicator, a torque indicator positioned within said optical field of the camera means for visually indicating the torque applied to said one element, and camera control means connected in controlling relation to said camera means and interconnected between said first and second elements to effect operation of said camera means automatically in response to relative movement of said first and second elements into a predetermined positional relationship to each other.

9. A tool testing machine comprising a base means, tool support means connected to said base means, a workpiece supporting means connected to said base means, tool means connected to said tool support means, means connected to said tool support means for effecting movement of said tool means relative to said workpiece supporting means, sensor means to sense the positioning of said tool means at predetermined positions relative to said workpiece support means, camera means, means supporting said camera means in a position in which an optical field of the camera means includes said tool means and control means connected to said camera means and said sensor means to actuate said camera means when said tool means is at any one of said predetermined positions.

10. A tool testing machine comprising, a base means, workpiece support means connected to said base means, tool support means connected to said base means, said tool support and workpiece support means being positioned apart from each other to define a tool area, sensor means connected to said workpiece support means to sense test conditions, means for displaying test data connected to said sensor means, camera means, support means positioning said camera means to view both said tool area and said means for displaying test data, and camera control means connected to said sensor means and said camera means to actuate said camera means when predetermined test conditions are sensed by said sensor means.

11. A tool testing machine comprising a base means, workpiece support means connected to said base means, tool support means connected to said base means, said tool support means and workpiece support means being spaced apart from each other to define a tool area, thrust force means connected to said tool support means to effect movement of said tool support means relative to said workpiece support means, sensor means connected to said thrust force means to sense the force applied to said tool support means by said thrust force means, camera means, support means positioning said camera means to view said tool area, and control means interconnecting said camera means and said sensor means to actuate said camera means when a predetermined thrust force is applied to said tool support means.

12. A tool testing machine comprising a base means, workpiece support means connected to said base means, tool support means connected to said base means, said tool support means and said workpiece support means being positioned apart from each other to define a tool area, driving means connected to said tool support means to apply torque to said tool support means, torque sensing means connected to said driving means to sense the torque applied by said driving means to said tool support means, torque indicator means connected to said driving means to visually indicate the torque applied to said tool support means by said driving means, thrust force means connected to said tool support means to move said tool support means relative to said workpiece supporting means, thrust force sensing means connected to said thrust force means to sense the force applied to said tool support means by said thrust force means, thrust force indicator means to visually indicate the force applied by said thrust force means to said tool support means, camera means, support means positioning said camera means so that the optical field of said camera means includes said tool area, said torque indicator means and said thrust force indicator means, and camera control means connecting said camera means to both said torque sensing means and said thrust force sensing means, said camera control means actuating said camera means when either a predetermined torque or a predetermined thrust force is applied to said tool supporting means.

13. A tool testing machine as set forth in claim 4 further including torque indicator means connected to said driving means to visually indicate the torque applied to said tool support means by said driving means, said torque indicator means being positioned within the optical field of said camera means.

14. A tool testing machine as set forth in claim 4 wherein said support means for positioning said camera means is pivotally connected to said base means, said camera support means being adjustable relative to said base means to position said camera means for different views of said work area.

15. A tool testing machine as set forth in claim 9 wherein said camera means includes a first single frame camera and a second rapid sequence camera, said sensor means includes first sensing means and second sensing means, and said control means includes first and second control circuit means, said first control circuit means being associated with said first sensing means to control the actuation of said first single frame camera, and said second control circuit means being associated with said second sensing means to control the actuation of said second rapid sequence camera.

16. A tool testing machine as set forth in claim 9 wherein said support means to position said camera means includes first frame means rotatably mounted on said base means, and second frame means connected to said first frame means, said camera means being mounted on said second frame means.

17. A tool testing machine as set forth in claim 9 further including a cycle counter mechanism connected to said control means to enable said camera means to be actuated by said control means during a predetermined cycle of said testing machine.

18. A tool testing machine as set forth in claim 17 wherein said camera means includes a first single frame camera and a second rapid sequence camera, said control means includes first control circuit means associated with said first single frame camera and second control circuit means associated with said second rapid sequence camera, and said cycle counter mechanism is connected in said first control circuit means to enable said first control circuit means to actuate said first single frame camera during a predetermined cycle in a predetermined number of cycles of said testing machine.

19. A tool testing machine as set forth in claim 9 wherein said sensor means includes switch means connected to said base, and a plurality of switch actuator means mounted on said tool support means for movement relative to said switch means, each of said plurality of switch actuator means being positioned to operate said switch means when said tool support means is at a different position relative to said workpiece supporting means.

20. A tool testing machine as set forth in claim 19 wherein each of said switch actuator means is adjustably mounted on said tool support means.

21. A tool testing machine as set forth in claim 10 wherein said support means for positioning said camera means is connected to said base means.

22. A tool testing machine as set forth in claim 10 wherein said means for displaying test data includes indicator means for indicating cutting speed, rate of feed, tool thrust, cutting torque, tool position and test cycle identification.

23. A tool testing machine as set forth in claim 11, wherein said thrust force means is adapted to effect translational movement of said tool support means, and wherein the rate of said translational movement is adjustable, said rate of translational movement being visually indicated by indicator means positioned to be viewed by said camera means.

24. A tool testing machine as set forth in claim 11 wherein said camera means includes a rapid sequence camera.

25. A tool testing machine as set forth in claim 12 wherein said camera means includes a rapid sequence camera.

26. A tool testing machine comprising base means, workpiece support means connected to said base means, tool support means connected to said base means, driving means connected to said tool support means to apply torque to said tool support means, thrust force means connected to said tool support means to move said tool support means relative to said workpiece support means, said tool support means and workpiece support means being spaced apart to define a tool area, first and second camera means, camera support means positioning said first and second camera means so that the optical field of both said first and second camera means is focused on said tool area, first sensor means connected between said work support means and said base means, first control circuit means connected to said first sensor means to actuate said first camera means when said tool support means is in a predetermined position relative to said work support means, second sensor means connected to said work support means, said second sensor means being adapted to sense predetermined test conditions including the application of a predetermined torque to said tool support means, the application of a predetermined thrust force to said tool support means and the positioning of said tool support means in a predetermined position relative to said work support means, second control circuit means connecting said second sensor means to actuate said second camera means when said second sensor means senses any one of said predetermined test conditions.

27. A tool testing machine as set forth in claim 26 wherein said first camera means includes a single frame camera and said second camera means includes a rapid sequence camera.

References Cited by the Examiner

UNITED STATES PATENTS

| | | |
|---|---|---|
| 1,199,980 | 10/1916 | Gilbreth. |
| 1,743,619 | 1/1930 | Pfeiffer _________ 346—107 X |
| 1,908,947 | 5/1953 | Benjamin _________ 346—107 |

FOREIGN PATENTS 595,020　11/1947　Great Britain.

RICHARD C. QUEISSER, *Primary Examiner.*